(12) United States Patent
Mizuguchi et al.

(10) Patent No.: US 6,208,683 B1
(45) Date of Patent: Mar. 27, 2001

(54) RECEIVING APPARATUS FOR USE IN CDMA TYPE MOBILE RADIO COMMUNICATION SYSTEM COMPRISING A PLURALITY OF PATH RECEIVERS EACH INCLUDING A FOLLOW-UP PATH DETECTION UNIT

(75) Inventors: Hironori Mizuguchi; Shousei Yoshida; Akihisa Ushirokawa, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/095,102

(22) Filed: Jun. 10, 1998

(30) Foreign Application Priority Data

Jun. 10, 1997 (JP) .................................................. 9-152154

(51) Int. Cl.[7] .................................................. H04L 27/30
(52) U.S. Cl. ............................ 375/140; 375/148; 455/137
(58) Field of Search .................................. 375/130, 148, 375/142, 143, 144, 150, 152, 343, 347; 370/335, 342, 441, 479; 455/132, 137, 133, 296, 63, 67.3, 31.1

(56) References Cited

U.S. PATENT DOCUMENTS

| 5,550,811 | * | 8/1996 | Kaku et al. | 370/342 |
| 5,687,162 | * | 11/1997 | Yoshida et al. | 370/203 |
| 5,740,208 | * | 4/1998 | Hulbert et al. | 375/346 |
| 5,940,432 | * | 8/1999 | Saito et al. | 375/206 |

FOREIGN PATENT DOCUMENTS

| 57-65935 | 4/1982 | (JP) . |
| 63-13440 | 1/1988 | (JP) . |
| 6-29948 | 2/1994 | (JP) . |
| 6-77928 | 3/1994 | (JP) . |
| 7-30514 | 1/1995 | (JP) . |
| 7-30519 | 1/1995 | (JP) . |
| 7-273713 | 10/1995 | (JP) . |

OTHER PUBLICATIONS

Mitsuo Yokoyama, *Spread Spectrum Communication Systems*, Kagaku Gijutsu Shuppan Sha, publishers, 1988, pp. 290–311.

\* cited by examiner

*Primary Examiner*—Chi Pham
*Assistant Examiner*—Emmanuel Bayard
(74) *Attorney, Agent, or Firm*—Sughrue, Mion, Zinn, Macpeak & Seas, PLLC (57) ABSTRACT

In a direct sequence/code division multiple access (DS/CDMA) type interference canceller receiving apparatus having a delaying unit for delaying a reception signal into zeroth through (N−1)-th delayed signals, zeroth through (N−1)-th path receivers for demodulating the zeroth thorough the (N−1)-th delayed signals into zeroth through (N−1)-th demodulated signals, and a combining unit for combining the zeroth through the (N−1)-th demodulated signals into a combined signal, an n-th path receivers includes an n-th follow-up path detection unit for detecting an n-th follow-up path for the n-th path receiver on the basis of a peculiar spread code in response to an n-th coefficient control signal. The n-th follow-up path detection unit produces n-th follow-up path information indicative of the n-th follow-up path. A follow-up path control unit controls path reception timings for the zeroth through the (N−1)-th path receivers on the basis of searched path information supplied from a multi-path searcher and zeroth through the (N−1)-th follow-up path information. The follow-up path control unit supplies the delaying unit with a path reception timing signal indicative of first through (N−1)-th delay amounts for first through (N−1)-th delay circuits in the delaying unit.

9 Claims, 6 Drawing Sheets

RECEIVING APPARATUS FOR USE IN CDMA TYPE MOBILE RADIO COMMUNICATION SYSTEM COMPRISING A PLURALITY OF PATH RECEIVERS EACH INCLUDING A FOLLOW-UP PATH DETECTION UNIT

BACKGROUND OF THE INVENTION

This invention relates to a mobile communication system and, in particular, to an interference canceller type receiving apparatus for use in a direct sequence/code division multiple access (DS/CDMA) cellular type mobile radio communication system.

As is well known in the art, various multiple access types have been adapted in a mobile radio communication system. One of the multiple access type is a CDMA cellular type. The CDMA cellular type mobile radio communication system assigns to each channel with a particular code, transmits to the same repeater a modulated wave to which a carrier having the same carrier frequency is spectrum-spread with the code, establishes code synchronization in each receiving side, and identifies a desired channel. The CDMA cellular type mobile radio communication system may be called a SSMA (spread spectrum multiple access) cellular type mobile radio communication system.

The CDMA type mobile communication system comprises a plurality of mobile stations and a plurality of radio base stations each of which serves as the repeater. Each radio base station is called a base transceiver station in the art. In addition, each mobile station is referred to as a terminal. As described above, inasmuch as the plurality of mobile station carry out communication using the carrier with the same carrier frequency, it is necessary for the CDMA type mobile radio communication system to be uniform reception energy of an upward communication channel from each mobile station communicating with the radio base station without a position of the mobile station.

In order to be uniform the reception energy in the radio base station, the CDMA type mobile radio communication system carries out transmission power control for the upward communication channel as described in TIA (Telecommunication Industry Association)/EIA (Electronic Industries Association)/IS-95.

The CDMA cellular type mobile radio communication systems are classified roughly into a direct sequence (DS) type and a frequency hopping (FH) type. As is indicated by its name, the direct sequence (DS) type is a type to realize spectrum spreading by directly multiplying a signal to be spectrum spread by a signal having an extremely broader band than that of the signal to be spectrum spread. On the other hand, the frequency hopping type (FH) is a type to realize spectrum spreading by hopping from a frequency to another frequency without fixing a carrier frequency to a particular frequency.

The DS/CDMA cellular type mobile radio communication system comprises a plurality of radio base stations which simultaneously use a carrier having the same carrier frequency. In addition, the DS/CDMA cellular type mobile radio communication system further comprises at least one mobile station which is assigned with its peculiar code (spread code). On transmission, the mobile station widely spreads its own signal by the peculiar spread code to transmit it to a transmission path. On reception, the mobile station receives from one or more radio base stations, as a reception signal, a plurality of path propagation signals which are propagated via different propagation paths. This is because the reception signal is affected by multi-path fading in a transmission path under environment of the mobile communication system.

In order to carry out reception operation at good quality, RAKE reception for separating and combining the different propagation paths is adopted in a DS/CDMA type receiving apparatus. On the RAKE reception, it is necessary for the DS/CDMA type receiving apparatus to follow temporal variations in the different propagation paths. In a conventional DS/CDMA type receiving apparatus, delay-lock loop (DLL) circuits are used as a path follow-up method in the manner which will later be described in conjunction with FIG. 1.

Such a delay-lock loop is described, for example, by Mitsuo Yokoyama in a book published by Kagaku Gijutsu Shuppan Sha, 1988, pages 290 to 311, under the title of "Spread Spectrum Communication Systems." In addition, the DS/CDMA type receiving apparatus using the delay-lock loop circuits is described, for example, in Japanese Unexamined Patent Publications of Tokkai No. Sho 57-65,935 or JP-A 57-65,935, of Tokkai No. sho 63-13,440 or JP-A 63-13,440, of Tokkai No. Hei 6-29,948 or JP-A 6-29,948, or the like.

On the other hand, a multi-access interference becomes an issue in the DS/CDMA system. This counter-measure is, for example, proposed in Japanese Unexamined Patent Publication of Tokkai No. Hei 7-30,519 or JP-A 7-30,519 which discloses a CDMA receiver with less reception characteristic deterioration against increase in the number of simultaneous operation users even in the environment of high speed fading or multi-path in the DS/CDMA system. According to JP-A 7-30,519, a signal subjected to coding multiplex is received by an antenna and band-limited by a reception filter. A signal in the designated timing is inputted to an interference elimination equalizer. Each interference equalizer regards a multi-path component of its own station in other timing equivalently as an other station signal and eliminates the signal together with the other station signal to detect only a multi-path component in the designated timing. Each multi-path component is multiplied with a synthesis weight coefficient and the result is synthesized at a synthesizer and a decision signal is obtained by a decision device.

In addition, JP-A 7-30,519 proposes a method of adaptively controlling tap coefficients in inverse spread filters. This method is called an adaptive interference canceller method which is abbreviated to an AIC method. In the AIC method, the delay lock loop circuits fall into disuse. This is because the AIC method automatically follows slow temporal variations in the different propagation paths by adaptively changing the tap coefficients in the inverse spread filters.

However, the CDMA receiver according to JP-A 7-30,519 is disadvantageous as described hereunder. Firstly, some of a plurality of rake fingers follow the same propagation path during use. Secondly, a departure of following occurs if propagation environment rapidly changes or if the environment of the multi-path dynamically changes. Thirdly, it is difficult to catch a new effective propagation path if it happens under the condition that the propagation environment rapidly changes.

Various other CDMA receivers related to the present invention are already known. By way of example, Japanese Unexamined Patent Publication of Tokkai No. Hei 6-77,928 or JP-A 6-77,928 discloses a spread spectrum communication synchronizing system which is capable of shorten the time up synchronization by detecting a peak with N pieces of matching filters and selecting the maximum of added values. According to JP-A 6-77,928, an inverse spread arithmetic part delays an input signal with a clock at the velocity of N multiple of a reciprocal of a spread rate while using a delay line, where N represents a natural number which is not less than two. A weighting coefficient for inverse spread is multiplied for every N pieces of taps of the delay line. Outputs of the same order in the N pieces of taps are synthesized. Thus, the N pieces of matching filters for performing the arithmetic of inverse spread are formed. On the other hand, N pieces of added value arithmetic parts are provided. Outputs of the respective matching filter are delayed by another delay line. Peak points at the outputs of respective taps in the other delay line are added and outputted. Further, the maximum value of the added value arithmetic part is selected by a maximum value selection part. This maximum value is supplied to the delay lines while controlling clock timing at a clock timing control part so as to increase the value.

Japanese Unexamined Patent Publication of Tokkai No. Hei 7-30,514 or JP-A 7-30,514 discloses a spread spectrum receiver which is capable of eliminating a multi-path interference signal in a received spread spectrum signal for a base band. According to JP-A 7-30,514, a matching filter applies inverse spread spectrum processing to a reception signal subjected to spread spectrum processing by using a code. A transmission line estimate means replies a pilot signal included in the reception signal to estimate a transmission characteristic of a multi-path transmission line to produce a tap coefficient. A transversal filter uses a tap coefficient as a tap weight to produce a maximum ratio synthesis signal of a pulse train. A multi-path interference recovery means responds to the tap coefficient, a demodulation signal and an inverse spread code to recover a multi-path interference signal. A subtracter means subtracts an interference signal from a delayed synthesis signal resulting from the synthesis signal delayed by a delay means and a discrimination means discriminates the subtraction signal to provide the output of a demodulation signal.

Japanese Unexamined Patent Publication of Tokkai No. Hei 7-273,713 or JP-A 7-273,713 discloses a reception equipment, a base station reception system, and a mobile station reception system which are capable of providing demodulated data of a lower error rate by suppressing the influence of interference signal from another station and suppressing the influence of multi-path in the reception system to which CDMA is applied. According to JP-A 7-273,713, a synchronizing signal is detected in a synchronizing signal detection part, and amplitude information and phase information of a main wave and delay wave are generated from this reproduced synchronizing signal. A synchronizing signal eliminating part uses the reproduced synchronizing signal to eliminate the synchronizing signal from the signal from a radio demodulation part and gives an obtained reception signal to another station interference eliminating part. Other station interference eliminating parts use the amplitude information and the phase information to estimate the signals of first through N-th stations while eliminating the intra-station interference from the reception signal. Estimated signals are subjected to correlation detection in correlation detection parts to obtain demodulated signals of the first through the N-th stations.

SUMMARY OF THE INVENTION

It is therefore an object of the present invention to provide a DS/CDMA type interference canceller receiving apparatus which is capable of always carrying out RAKE reception in stable even under environment of a multi-path which dynamically changes.

It is another object of the present invention to provide a DS/CDMA type interference canceller receiving apparatus of the type described, which has good resistance to interference.

Other objects of this invention will become clear as the description proceeds.

According to an aspect of this invention, a direct sequence/code division multiple access (DS/CDMA) type interference canceller receiving apparatus comprises a delaying unit supplied with a reception signal via different propagation paths. The delaying unit delays the reception signal for first through (N–1)-th delay amounts to produce zeroth through (N–1)-th delayed signals, where N represent a positive integer which is not less than two. The zeroth delayed signal is the reception signal as it is. The first through the (N–1) delayed signals are signals into which the reception signal are delayed for the first through the (N–1)-th delay amounts, respectively. Connected to the delaying unit and supplied with a peculiar spread code in common and with the zeroth through the (N–1)-th delayed signals, respectively, zeroth through (N–1)-th path receivers demodulates the zeroth through the (N–1)-th delayed signals in response to zeroth through (N–1)-th coefficient control signals each indicative of adaptive tap coefficients to produce zeroth through (N–1)-th demodulated signals, respectively. The zeroth through the (N–1)-th path receivers include zeroth through (N–1)-th follow-up path detection units for detecting zeroth through (N–1)-th follow-up paths for said zeroth through said (N–1)-th path receivers on the basis of the peculair spread code in response to the zerogh through the (N–1)-th coefficient control signals, respectively. The zeroth through the (N–1)-th follow-up path detection units produce zeroth through (N–1)-th follow-up path information indicative of the zeroth through the (N–1)-th follow-up paths, respectively. Connected to the zeroth though the (N–1)-th path receivers, a combining unit combines the zeroth through the (N–1)-th demodulated signals into a combined signal. Supplied with the reception signal, a multi-path searcher searches the different propagation paths in response to the reception signal to produce searched path information indicative of the different propagation paths. Connected to the multi-path searcher, the delaying unit, and the zeroth through the (N–1)-th path receivers, a follow-up path control unit controls path reception timings for the zeroth through the (N–1)-th path receivers on the basis of the searched path information and the zeroth through the (N–1)-th follow-up path information. The follow-up path control unit supplies the delaying unit with a path reception timing signal indicative of the first through the (N–1)-th delay amounts.

DESCRIPTION OF THE PREFERRED EMBODIMENTS

Figure 1:
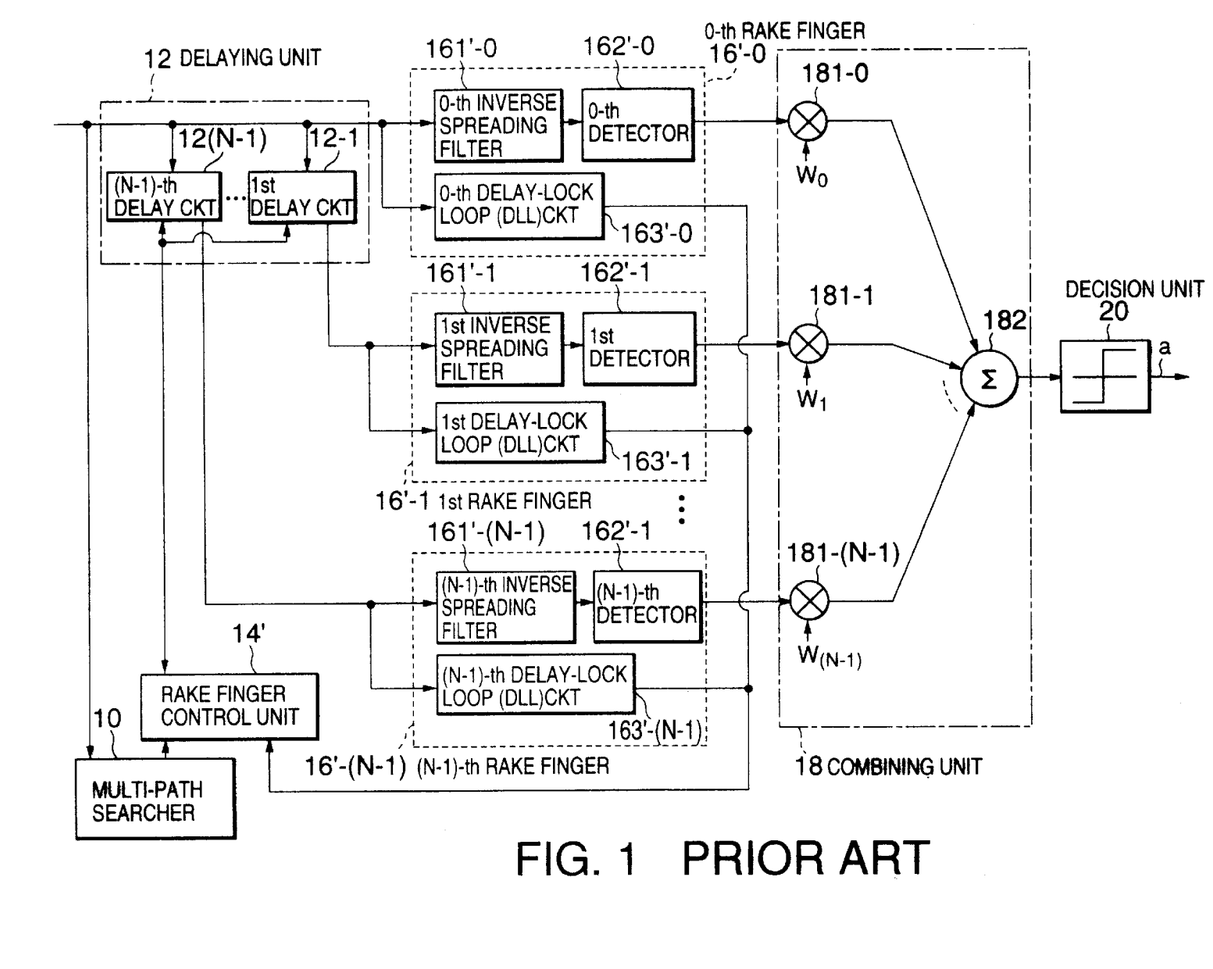
FIG. 1 is a block diagram of a conventional DS/CDMA type receiving apparatus.

Referring to FIG. 1, a conventional DS/CDMA type receiving apparatus will be described in order to facilitate an understanding of the present invention. The illustrated DS/CDMA type receiving apparatus comprises a multi-path searcher 10, a delaying unit 12, a RAKE finger control unit 14', zeroth through (N−1)-th RAKE fingers 16'-0, 16'-1, . . . , and 16'-(N−1), a combining unit 18, and a decision unit 20, where N represents a positive integer which is not less than two. Each RAKE finger is called a path receiver. In addition, the RAKE finger control unit 14' is referred to as a follow-up path control unit. Furthermore, the combining unit 18 is referred to as a synthesizer while the decision unit 20 is called a discrimination unit.

The multi-path searcher 10 receives a reception signal. The reception signal is a set of multi-path propagation signals each of which is code division multiplexed with a DS/CDMA system and which are propagated via different propagation paths. Responsive to the reception signal, the multi-path searcher 10 searches the different propagation paths to produce searched path information indicative of the different propagation paths. The searched path information is supplied to the RAKE finger control unit 14'.

On the other hand, the delaying unit 12 is supplied with the reception signal. The delaying unit 12 delays the reception signal into zeroth through (N−1)-th delayed signals. More specifically, the delaying unit 12 produces the reception signal as the zeroth delay signal with no delay as it is. In addition, the delaying unit 12 comprises first through (N−1)-th delay circuits 12-1, . . . , and 12-(N−1). The first through the (N−1)-th delay circuits 12-1 to 12-(N−1) are set with first through (N−1)-th delay amounts which are given by the RAKE finger control unit 14' in the manner which will later be described.

The first delay circuit 12-1 delays the reception signal for the first delay amount to produce the first delayed signal. The (N−1)-th delay unit 12-(N−1) delays the reception signal for the (N−1)-th delay amount to produce the (N−1)-th delayed signal. In general, an n-th delay unit 12-n delays the reception signal for an n-th delay amount to produce an n-th delayed signal, where n is variable between one and (N−1), both inclusive.

At any rate, the delaying unit 12 produces the zeroth through the (N−1)-th delayed signals as reception signals whose reception timings are adjusted. The zeroth through the (N−1)-th delayed signals are supplied to the zeroth through the (N−1)-th RAKE fingers 16'-0 to 16'-(N−1), respectively.

The zeroth through the (N−1)-th RAKE fingers 16'-0 to 16'-(N−1) demodulate the zeroth through the (N−1)-th delayed signals by inverse spreading to produce zeroth through (N−1)-th demodulated signals, respectively. In addition, the zeroth through the (N−1)-th RAKE fingers 16'-0 to 16'-(N−1) have similar structure.

That is, the zeroth RAKE finger 16'-0 comprises a zeroth inverse spreading filter 161'-0, a zeroth detector 162'-0, and a zeroth delay-lock loop (DLL) circuit 163'-0. Similarly, the first RAKE finger 16'-1 comprises a first inverse spreading filter 161'-1, a first detector 162'-1, and a first delay-lock loop (DLL) circuit 163'-1. The (N−1)-th RAKE finger 16'-(N−1) comprises an (N−1)-th inverse spreading filter 161'-(N−1), an (N−1)-th detector 162'-(N−1), and an (N−1)-th delay-lock loop (DLL) circuit 163'-(N−1). In general, an n-th RAKE finger 16'-n comprises an n-th inverse spreading filter 161'-n, an n-th detector 162'-n, and an n-th delay-lock loop (DLL) circuit 163'-n.

In the n-th RAKE finger 16'-n, the n-th delayed signal is supplied to the n-th inverse spreading filter 161'-n and the n-th delay-lock loop circuit 163'-n. The n-th inverse spreading filter 161'-n inverse spreads the n-th delayed signal to produce an n-th inverse spread signal. The n-th inverse spread signal is supplied to the n-th detector 162'-n. The n-th detector 162'-n carries out carrier phase synchronization on the n-th inverse spread signal to produce an n-th carrier phase signal as an n-th demodulated signal. The n-th carrier phase signal is called an n-th detected signal. The n-th detected signal or the demodulated signal is supplied to the combining unit 18. On the other hand, the n-th delay-lock loop circuit 163'-n carries out a delay-lock loop processing on the n-th delayed signal to produce an n-th delay locked signal in the manner known in the art. The n-th delay-locked signal is supplied to the rake finger control unit 14'.

The combining unit 18 is supplied with the zeroth through the (N−1)-th modulated signals from the zeroth through the (N−1)-th RAKE fingers 16'-0 to 16'-(N−1), respectively. The combining unit 18 combines the zeroth through the (N−1)-th demodulated signals into a combined signal.

More specifically, the combining unit 18 comprises zeroth through (N−1)-th multipliers 181-0, 181-2, . . . , and 181-(N−1) and a summing circuit 182. The zeroth through the (N−1)-th multipliers 181-0 to 181-(N−1) are supplied with the zeroth through (N−1)-th demodulated signals from the zeroth through the (N−1)-th RAKE fingers 16'-0 to 16'-(N−1), respectively. The zeroth through the (N−1)-th multipliers are given with zeroth through (N−1)-th weighting factors or coefficient $W_0$, $W_1$, . . . , and $W_{(N-1)}$, respectively.

The zeroth multiplier 181-0 multiplies the zeroth detected signal by the zeroth weighting coefficient $W_0$ to produce a zeroth multiplied signal. Likewise, the first multiplier 181-1 multiplies the first detected signal by the first weighting coefficient $W_1$ to produce a first multiplied signal. The (N−1)-th multiplier 181-(N−1) multiplies the (N−1)-th detected signal by the (N−1)-th weighting coefficient $W_{(N-1)}$ to produce an (N−1)-th multiplied signal. In general, an n-th multiplier 181-n multiplies an n-th detected signal by an n-th weighting coefficient $W_n$ to produce an n-th multiplied signal. The zeroth through the (N−1)-th multiplied signals are supplied to the summing circuit 182. The summing circuit 182 sums N-terms of the zeroth through the (N−1)-th multiplied signals to produce a summed signal as the combined signal. The combined or the summed signal is supplied to the decision unit 20.

The decision unit 20 carries out decision operation on the combined signal to produce a decided signal a.

The RAKE finger control unit 14' is supplied from the zeroth through the (N−1)-th RAKE fingers 16'-0 to 16'-(N−1) with zeroth through (N−1)-th delay-locked signals, respectively. In addition, the RAKE finger control unit 14' is supplied from the multi-path searcher 10 with the searched path information as described above. Responsive to the zeroth through the (N−1)-th delay-locked signals, the RAKE finger control unit 14' controls reception timings for the different propagation paths on the basis of the searched path information. The RAKE finger control unit 14' supplies the delaying unit 12 with a path reception timing signal indicative of the first through the (N−1)-th delay amounts.

As described above, the conventional DS/CDMA type receiving apparatus comprises a plurality of RAKE fingers each of which includes the delay-lock loop (DLL) circuit.

In order to solve an issue of a multi-access interference, the above-mentioned JP-A 7-30,519 proposes a method of adaptively controlling tap coefficients for use in inverse spreading filters. This method is called an adaptive interference canceller method which is abbreviated to an AIC method. In the AIC method, the above-mentioned delay lock loop circuits fall into disuse. This is because the AIC method automatically follows slow temporal variations in the different propagation paths by adaptively changing the tap coefficients for the inverse spread filters.

However, a CDMA receiver according to JP-A 7-30,519 is disadvantageous as described hereunder. Firstly, some of a plurality of rake fingers follow the same propagation path during use. Secondly, a departure of following occurs if propagation environment rapidly changes or if the environment of the multi-path dynamically changes. Thirdly, it is difficult to catch a new effective propagation path if it happens under the condition that the propagation environment rapidly changes, as mentioned in the preamble of the instant specification.

Figure 2:
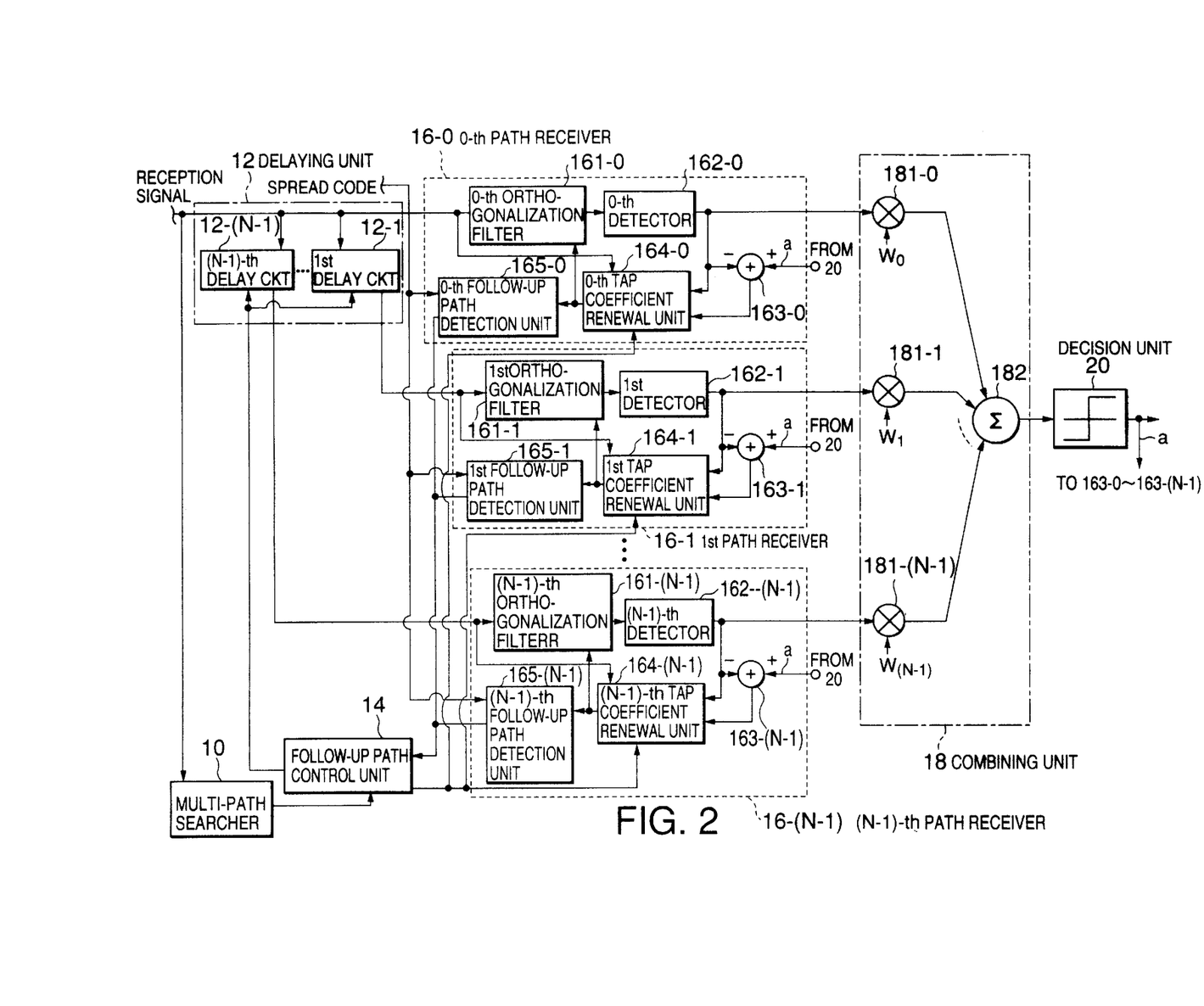
FIG. 2 is a block diagram of a DS/CDMA type interference canceller receiving apparatus according to a first embodiment of the instant invention.

Referring to FIG. 2, the description will proceed to a DS/CDMA type interference canceller receiving apparatus according to a first embodiment of the present invention. The illustrated DS/CDMA type interference canceller receiving apparatus is similar in structure and operation to the conventional DS/CDMA type receiving apparatus illustrated in FIG. 1 except that the DS/CDMA type interference canceller receiving apparatus comprises zeroth through (N−1)-th path receivers 16-0, 16-1, ..., and 16-(N−1) in lieu of the zeroth through the (N−1)-th RAKE fingers 16'-0 to 16'-(N−1) and a follow-up path control unit 14 in place of the RAKE finger control unit 14'. The path receiver is called the RAKE finger while the follow-up path control unit 14 is referred to as the RAKE finger control unit.

The zeroth through the (N−1)-th path receivers 16-0 to 16-(N−1) demodulate the zeroth through the (N−1)-th delayed signals in response to zeroth through (N−1)-th coefficient control signals each indicative of adaptive tap coefficients to produce zeroth through (N−1)-th demodulated signals, respectively, in the manner which will become clear as the description proceeds. The zeroth through the (N−1)-th path receivers 16-0 to 16-(N−1) have similar structure.

That is, the zeroth path receiver 16-0 comprises a zeroth orthogonalization filter 161-0, a zeroth detector 162-0, a zeroth local subtractor 163-0, a zeroth tap coefficient renewal unit 164-0, and a zeroth follow-up path detection unit 165-0. Similarly, the first path receiver 16-1 comprises a first orthogonalization filter 161-1, a first detector 162-1, a first local subtractor 163-1, a first tap coefficient renewal unit 164-1, and a first follow-up path detection unit 165-1. The (N−1)-th path receiver 16-(N−1) comprises an (N−1)-th orthogonalization filter 161-(N−1), an (N−1)-th detector 162-(N−1), an (N−1)-th local subtractor 163-(N−1), an (N−1)-th tap coefficient renewal unit 164-(N−1), and an (N−1)-th follow-up path detection unit 165-(N−1). In general, an n-th path receiver 16-n comprises an n-th orthogonalization filter 161-n, an n-th detector 162-n, an n-th local subtractor 163-n, an n-th tap coefficient renewal unit 164-n, and an n-th follow-up path detection unit 165-n.

In the n-th path receiver 16-n, the n-th delayed signal is supplied to the n-th orthogonalization filter 161-n from the delaying unit 12. The n-th orthogonalization filter 161-n is supplied from the n-th tap coefficient renewal unit 164-n with an n-lh coefficient control signal representative of a set of adaptive tap coefficients in the manner which will later described. The adaptive tap coefficients are referred to as orthogonalization coefficients. On the basis of the n-th coefficient control signal, the n-th orthogonalization filter 161-n carries out orthogonalization operation on the n-th delayed signal to produce an n-th orthogonalized signal. In other words, the n-th orthogonalization filter 161-n carries out inverse spreading operation on the n-th delayed signal using the orthogonalization coefficients represented by the n-th coefficient control signal to suppress an interference wave and to detect a desired wave. Accordingly, the orthogonalization filter is called an adaptive inverse spreading filter. The n-th orthogonalization filter 161-n may be implemented by a linear equalizer such as a transversal filter in the manner which will presently be described.

Figure 3:
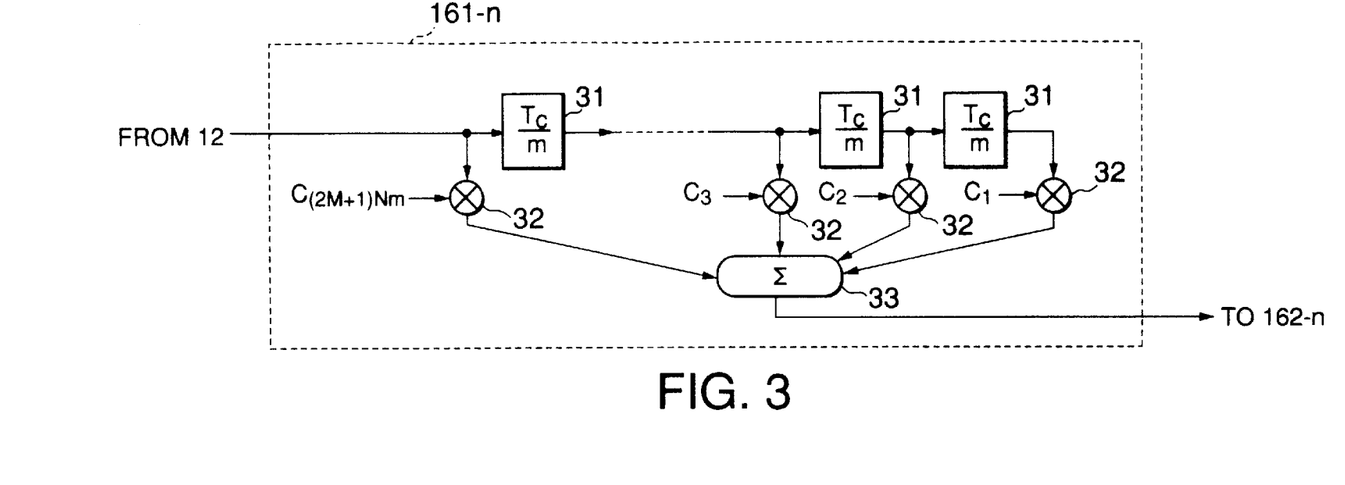
FIG. 3 is a block diagram of an n-th orthogonalization filter in an n-th path receiver for use in the DS/CDMA type interference canceller receiving apparatus illustrated in FIG. 2.

Turning to FIG. 3, the n-th orthogonalization filter 161-n consists of the transversal filter which comprises a plurality of delay units 31, a plurality of multipliers 32, and a summing unit 33. In FIG. 3, Tc represents a chip delay which is substantially equal to a reciprocal of a chip rate. The multipliers 32 are equal in number to (2M+1)Nm where M represents the length (bit) of the filter, N represents the length of a spread code, and m represents a sampling number per chip. The delay units 31 are connected in series and are equal in number to (2M+1)Nm minus one. Each delay unit 31 provides a delay equal to Tc/m. The delay units 31 constitutes a single delay line having (2M+1)Nm taps which are connected to the respective multipliers 32. The single delay line delays the n-th delayed signal to produce (2M+1)Nm tap signals from the (2M+1)Nm taps. The (2M+1)Nm tap signals are supplied to the respective multipliers 32.

The multipliers 32 are supplied from the n-th tap coefficient renewal unit 164-n (FIG. 2) with the adaptive tap coefficients or the orthogonalization coefficients of the n-th coefficient control signal that are depicted at $C_1$, $C_2$, $C_3$, ..., and $C_{(2M+1)Nm}$. Each multiplier 32 multiplies the tap signal by the corresponding adaptive tap coefficient to produce a multiplied signal. The summing unit 33 sums up (2M+1)Nm terms of the multiplied signals from the respective multipliers 32 to produce a summed-up signal as the n-th orthogonalized signal which is delivered to the n-th detector 162-n (FIG. 2).

Figure 6:
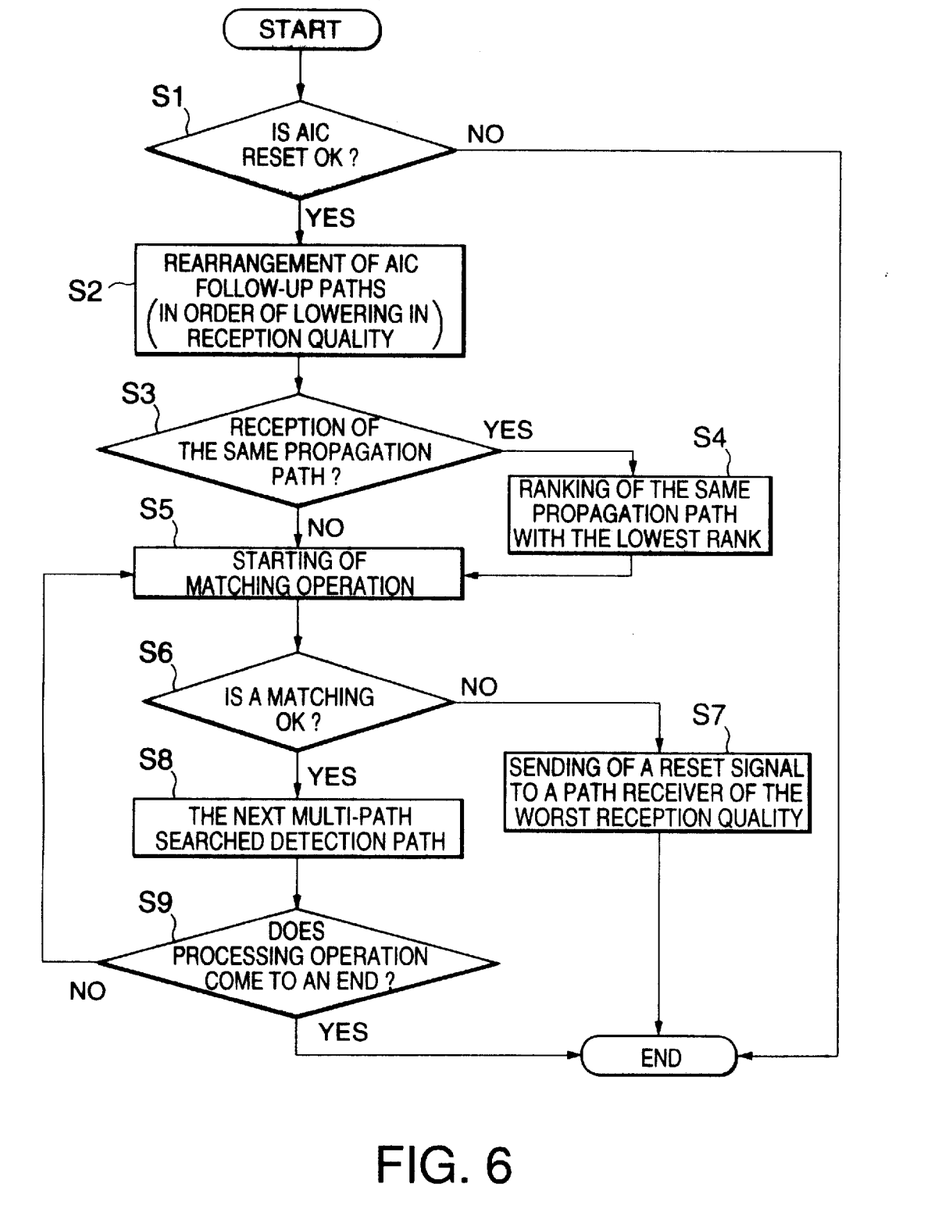
FIG. 6 shows a flow chart for use in describing operation of the follow-up path control unit illustrated in FIG. 5.

In addition, such a transversal filter is depicted in Japanese Unexamined Patent Publication of Tokkai No. Hei 8-56,213 of JP-A 8-56,213 (FIG. 6 thereof).

Turning back to FIG. 2, the n-th detector 162-n is supplied from the n-th orthogonalization filter 161-n with the n-th orthogonalized signal. The n-th detector 162-n carries out detection operation on the n-th orthogonalized signal to produce an n-th detected signal. More specifically, the n-th detector 162-n carries out carrier phase synchronization on the desired wave to produce an n-th carrier phase signal as the n-th detected signal. The n-th detected signal or the n-th carrier phase signal is supplied to the combining unit 18 as the n-th demodulated signal.

On the other hand, the n-th detected signal is also supplied to the n-th local subtracter 163-n. The n-th local subtracter 163-n is supplied with the decided signal a from the decision unit 20. The n-th local subtracter 163-n subtracts the n-th detected signal from the decided signal a to produce an n-th local error signal. In other words, the n-th local subtracter 163-n calculates an n-th local difference between the n-th detected signal and the decided signal a to produce the n-th local error signal indicative of the n-th local difference. The n-th local error signal is supplied to the n-th tap coefficient renewal unit 164-n.

The n-th tap coefficient renewal unit 164-n is also supplied with the n-th delayed signal and the n-th detected signal from the delaying unit 12 and the n-th detector 162-n, respectively. Responsive to the n-th delayed signal, the n-th detected signal, and the n-th local error signal, the n-th tap coefficient renewal unit 164 renews the adaptive tap coefficients of the n-th coefficient control signal so as to minimize mean power of the n-th local error signal. Such a control algorithm is known as a minimum mean square error (MMSE) algorithm in the art. The n-th tap coefficient renewal unit 164 produces the n-th coefficient control signal representative of the adaptive tap coefficients or the orthogonalization coefficients.

In addition, the n-th tap coefficient renewal unit 164-n is supplied with an n-th reset signal from the following path control unit 14 in the manner which will later be described. Responsive to the n-th reset signal, the n-th tap coefficient renewal unit 164-n resets the adaptive tap coefficients of the n-th coefficient control signal.

The n-th coefficient control signal is supplied to the n-th orthogonalization filter 161-n and the n-th follow-up path detection unit 165-n. The n-th follow-up path detection unit 165-n is supplied with its own station code which is a peculiar spread code assigned to a station in question. Responsive to the n-th coefficient control signal and the own station code, the n-th follow-up path detection unit 165-n detects an n-th follow-up path for the n-th path receiver 16-0 to produce n-th follow-up path information indicative of the n-th follow-up path in the manner which will presently described. The n-th follow-up path information is delivered to the following path control unit 14.

Figure 4:
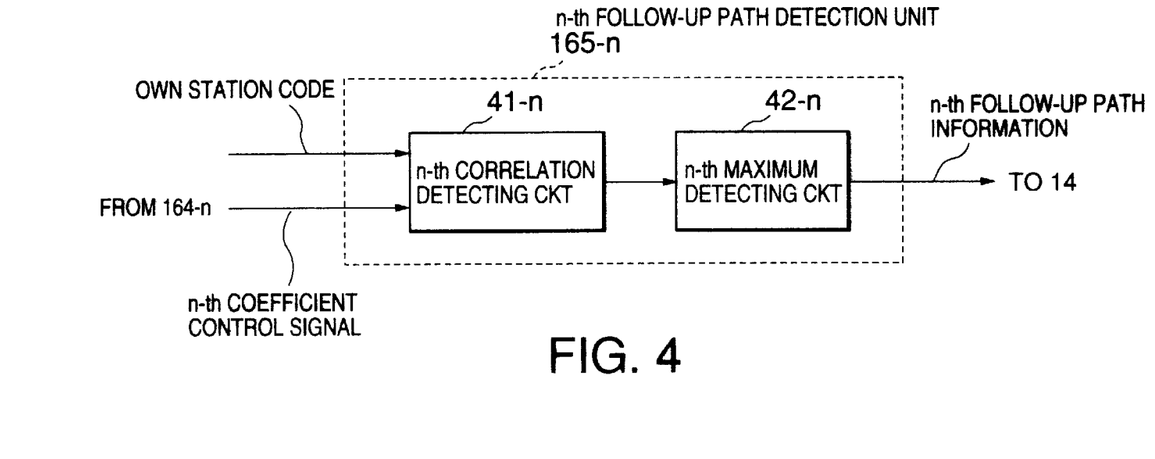
FIG. 4 is a block diagram of an n-th follow-up path detection unit in the n-th path receiver for use in the DS/CDMA type interference canceller receiving apparatus illustrated in FIG. 2.

Referring to FIG. 4, the n-th follow-up path detection unit 165-n comprises an n-th correlation detecting circuit 41-n and an n-th maximum detecting circuit 42-n. The n-th correlation detecting circuit 41-n is supplied with the own station code and the n-th coefficient control signal. The n-th correlation detecting circuit 41-n calculates cross-correlation between the adaptive tap coefficients ( the orthogonalization coefficients) represented by the n-th coefficient control signal and the peculiar spread code assigned with the station in question to produce an n-th cross-correlated signal indicative of the cross-correlation. The n-th cross-correlated signal is supplied to the n-th maximum detecting circuit 42-n. The n-th maximum detecting circuit 42-n detects a maximum in the n-th cross-correlated signal to produce a n n-th maximum detected signal indicative of the maximum as the n-th follow-up path information which is delivered to the follow-up path control unit 14 (FIG. 2).

Turning back to FIG. 2, the follow-up path control unit 14 is supplied with the zeroth through the (N–1)-th follow-up path information from the zeroth through the (N–1)-th follow-up path detection units 165-0 to 165-(N–1), respectively. The follow-up path control unit 14 is also supplied with the searched path information from the multi-path searcher 10. The follow-up path control unit 14 carries out follow-up control of reception timings for the zeroth through the (N–1)-th path receivers 16-0 to 16-(N–1) on the basis of the searched path information and the zeroth through the (N–1)-th follow-up path information in the manner which will presently be described.

Figure 5:
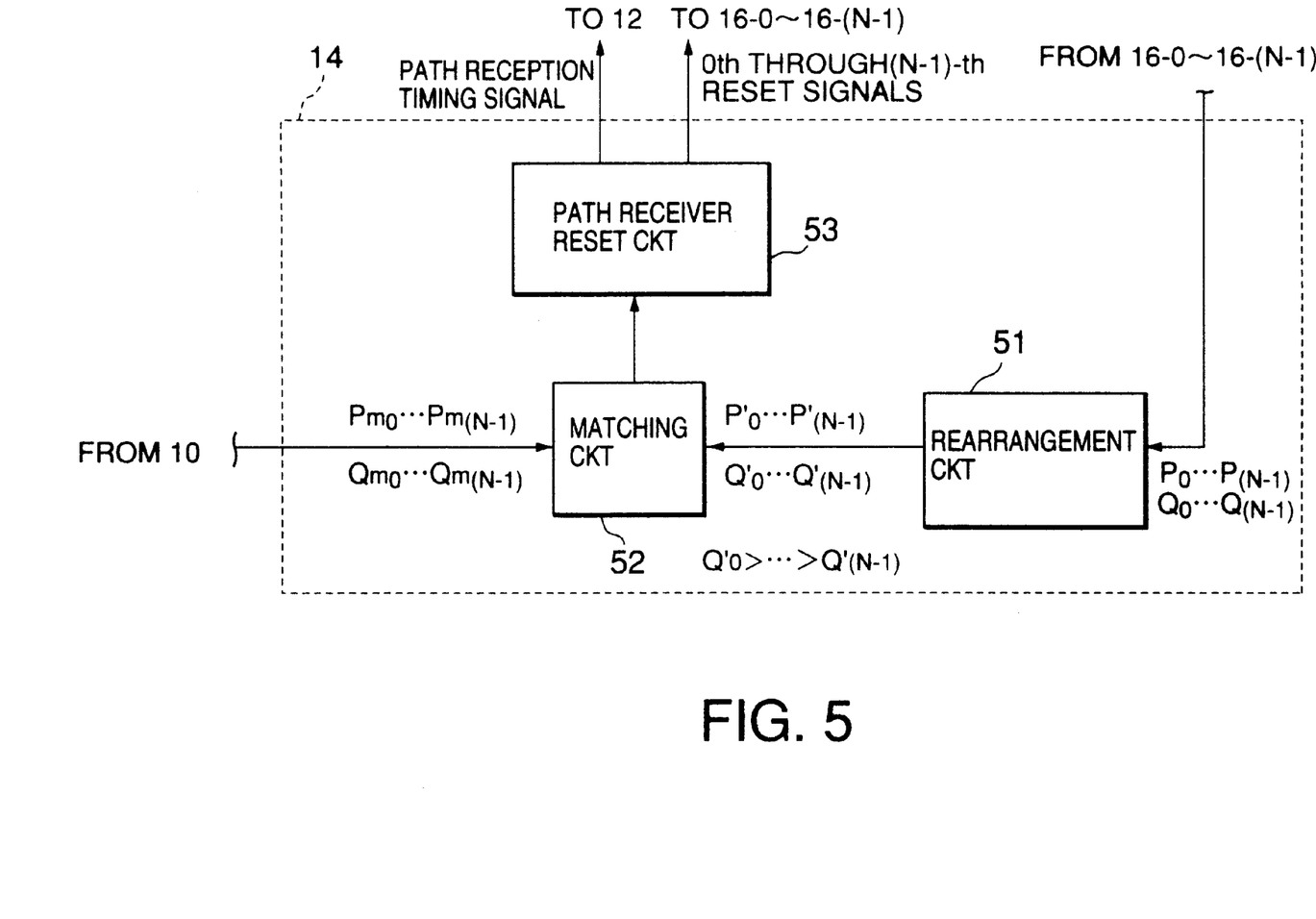
FIG. 5 is a block diagram of a follow-up path control unit for use in the DS/CDMA type interference canceller receiving apparatus illustrated in FIG. 2.

Turning to FIG. 5, the description will proceed to the follow-up path control unit 14 in more detail. The searched path information indicates zeroth through (N–1)-th multi-path searched detection paths $P_{m0}, \ldots,$ and $P_{m(N-1)}$ with zeroth through (N–1)-th searcher reception quality $Q_{m0}, \ldots,$ and $Q_{m(N-1)}$. In other words, the zeroth through the (N–1)-th multi-path searched detection paths $P_{m0}$ to $P_{m(N-1)}$ have the zeroth through the (N–1)-th searcher reception quality $Q_{m0}$ to $Q_{m(N-1)}$, respectively. On the other hand, the zeroth through the (N–1)-th follow-up path information indicate zeroth through (N–1)-th AIC follow-up paths $P_0, \ldots, P_{(N-1)}$ with zeroth through (N–1)-th follow-up reception quality $Q_0, \ldots,$ and $Q_{(N-1)}$. In other words, the zeroth through the (N–1)-th AIC follow-up paths $P_0$ to $P_{(N-1)}$ have the zeroth through the (N–1)-th follow-up reception quality $Q_0$ to $Q_{(N-1)}$, respectively.

As shown in FIG. 5, the illustrated follow-up path control unit 14 comprises an rearrangement circuit 51, a matching circuit 52, and a path receiver reset circuit 53. The rearrangement circuit 51 is supplied from the zeroth through the (N–1)-th follow-up path detection units 165-0 to 165-(N–1) with the zeroth through the (N–1)-th follow-up path information. The rearrangement circuit 51 rearranges the zeroth through the (N–1)-th AIC follow-up paths $P_0$ to $P_{(N-1)}$ having the zeroth through the (N–1)-th follow-up reception quality $Q_0$ to $Q_{(N-1)}$ in the order of increasing in reception quality to produce zeroth through (N–1)-th rearranged AIC follow-up paths $P'_0, \ldots,$ and $P'_{(N-1)}$ having zeroth through (N–1)-th rearranged follow-up reception quality $Q'_0, \ldots,$ and $Q'_{(N-1)}$, respectively. The zeroth through the (N–1)-th rearranged AIC follow-up paths $P'_0$ to $P'_{(N-1)}$ having the zeroth through the (N–1)-th rearranged follow-up reception quality $Q'_0$ to $Q'_{(N-1)}$ are supplied to the matching circuit 52.

The matching circuit 52 is also supplied from the multi-path searcher 10 with the zeroth through the (N–1)-th multi-path searched detection paths $P_{m0}$ to $P_{m(N-1)}$ having the zeroth through the (N–1)-th searcher reception quality $Q_{m0}$ to and $Q_{m(N-1)}$ which are indicated by the searched path information. The matching circuit 52 matches the zeroth through the (N–1)-th rearranged AIC follow-up paths $P'_0$ to $P'_{(N-1)}$ having the zeroth through the (N–1)-th rearranged follow-up reception quality $Q'_0$ to $Q'_{(N-1)}$ with the zeroth through the (N–1)-th multi-path searched detection paths $P_{m0}$ to $P_{m(N-1)}$ having the zeroth through the (N–1)-th searcher reception quality $Q_{m0}$ to $Q_{m(N-1)}$ to produce matching result signals indicative of matching results. The matching result signals are successively supplied to the path receiver reset circuit 53.

Responsive to the matching result signals, the path receiver reset circuit 53 supplies the delaying unit 12 and the zeroth through the (N–1)-th tap coefficient renewal units 164-0 to 164-(N–1) with a path reception timing signal indicative of the first through the (N–1)-th delay amounts and the zeroth through the (N–1)-th reset signals, respectively, in the manner which will presently be described.

The path receiver reset circuit 53 makes the zeroth through the (N–1)-th path receivers 16-0 to 16-(N–1) preferentially receive the reception signals via the propagation paths having good reception quality on the basis of the matching result signals. It will be assumed that a plurality of path receivers receive the reception signal via a specific propagation path detected by the multi-path searcher 10. In this event, the path receiver reset circuit 53 makes the path receivers except for a particular path receiver receive the reception signals via other propagation paths having new good reception quality. In addition, it will be presumed that a plurality of path receivers cannot receive the reception signals via propagation paths having better reception quality.

Under the circumstances, the path receiver reset circuit 53 resets a particular path receiver receiving the reception signal via a propagation path having the worst reception quality by supplying a reset signal to the particular path receiver and then makes the particular path receiver receive the reception signal via another propagation path having new good reception quality.

In addition, the path receiver reset circuit 53 does not carry out such a reset operation during a predetermined time interval lapsed from a time instant when the path receiver reset circuit 53 carries out the reset operation for a specific path receiver. The predetermined time interval is determined by a time interval required to convergence for the adaptive tap coefficients after the reset operation and/or by a variation rate of the multi-path propagation path.

Referring to FIG. 6 in addition to FIG. 5, description will be made as regards operation of the follow-up path control unit 14. First, the rearrangement circuit 51 determines whether or not AIC reset is OK at a step S1. When the AIC reset is not OK, processing operation comes to an end. When the AIC reset. is OK, the step S1 is followed by a step S2 at which the rearrangement circuit 51 rearranges the AIC follow-up paths $P_0$ to $P_{(N-1)}$ in the order of lowering in reception quality to produce the rearranged AIC follow-up paths $P'_0$ to $P'_{(N-1)}$. The step S2 proceeds to a step S3 at which the rearrangement circuit 51 determines whether or not a plurality of path receivers receive the reception signal via the same propagation path. When the plurality of path receivers receive the reception signal via the same propagation path, the step S3 is succeeded by a step S4 at which the rearrangement circuit 51 ranks the same propagation path with the lowest rank.

The step S4 is followed by a step S5 which follows the step S3 when the plurality of path receivers receive the reception signals via different propagation paths. At the step S5, the matching circuit 52 starts a matching operation. The step S5 proceeds to a step S6 at which the matching circuit 52 determines whether or not a matching is OK. When matching is not OK, the step S6 is succeeded by a step S7 at which the path receiver reset circuit 53 sends a reset signal to a particular path receiver receiving the reception signal via a specific propagation path having the worst reception quality. Accordingly, the particular path receiver is reset by the path receiver reset circuit 53.

On the other hand, when the matching is OK, the step S6 is followed by a step S8 at which the matching circuit 52 turns to the next multi-path searched detection path. The step S8 proceeds to a step S9 at which the matching circuit 52 determines whether or not the processing operation comes to an end. When the processing operation does not come to an end, the step S9 is turned back to the step S5.

In brief described above, the n-th follow-up path detection unit 165-n in the n-th path receiver 16-n detects the n-th follow-up path which the n-th orthogonalization filter 161-n follows by calculating the maximum of the cross-correlation between the n-th coefficient control signal and the peculiar spread code to send the n-th follow-up path information indicative of the n-th follow-up path to the follow-up path control unit 14.

The follow-up path control unit 14 monitors whether or not the same one is included among path timings (the propagation paths) which the path receivers follow. It is assumed that the same one is included among the path timings. In this event, the follow-up path control unit 14 delivers a new path timing to the delay circuit corresponding to the path receiver in question and make the path receiver in question restart an adaptive operation. This operation is called a path timing reset. In addition, it is presumed that the respective path receivers follow individual path timings or different propagation paths. Under the circumstances, the follow-up path control unit 14 compares the multi-path searched detection paths detected by the multi-path searcher 10 with the zeroth through the (N−1)-th AIC follow-up paths detected by the zerogh through the (N−1)-th follow-up path detection units 165-0 to 165-(N−1) and then resets the path receiver having the path timing where there is no comparison therebetween.

In all cases, the new path timing is one having the best reception quality among them where the multi-path searched detection paths are not matched with the AIC follow-up paths. This reset operation is not carried out during the predetermined time interval after the reset operation is carried out for a path receiver in consideration of a time interval required to convergence of the adaptive tap coefficients. In addition, the reset operation is not simultaneously carried out for a plurality of path receivers in order to stabilize reception operation of the DS/CDMA type interference canceller receiving apparatus. With this structure, it is possible for path receivers (RAKE fingers) to always follow different effective propagation paths.

Figure 7:
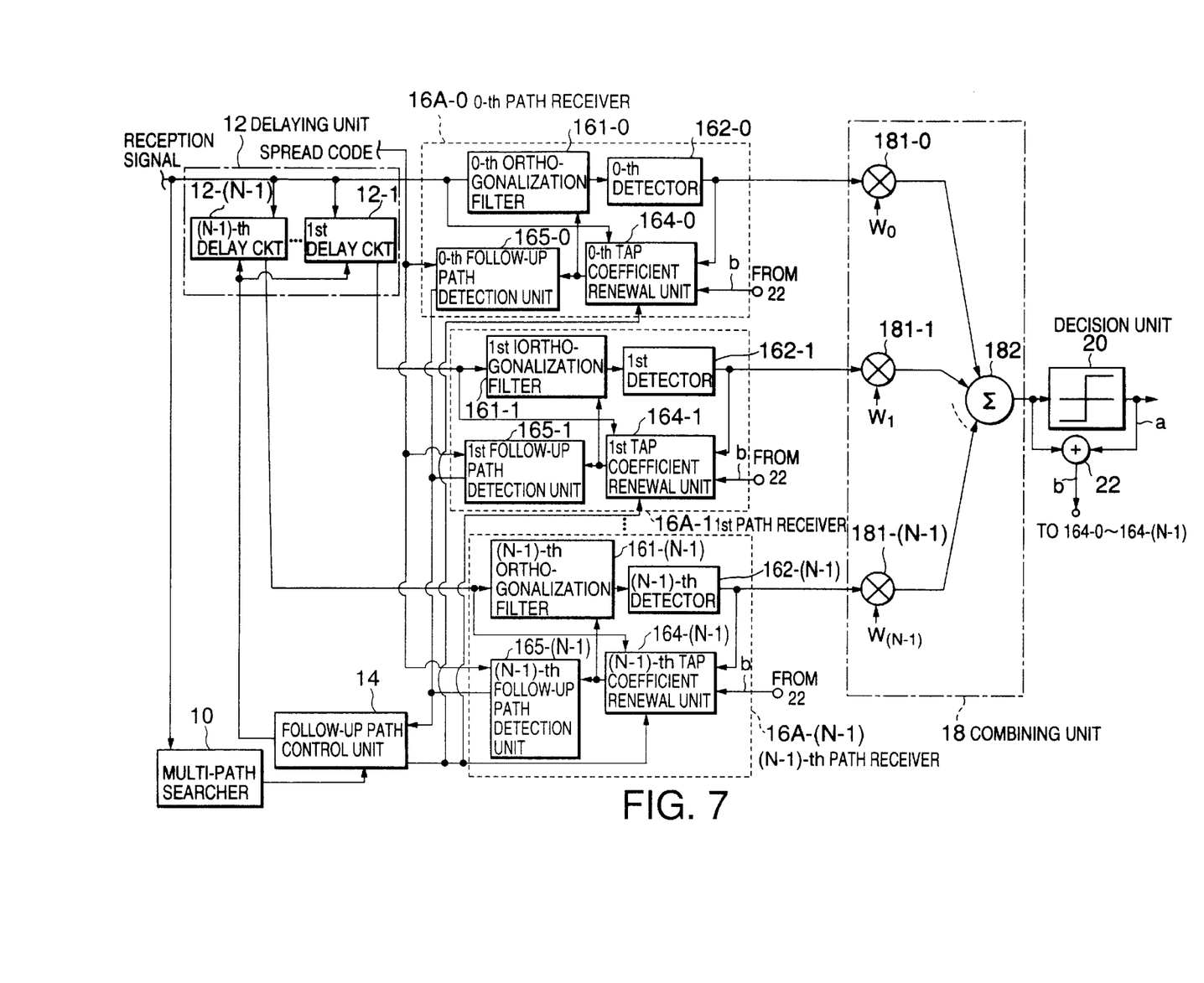
FIG. 7 is a block diagram of a DS/CDMA type interference canceller receiving apparatus according to a second embodiment of the instant invention.

Referring to FIG. 7, the description will proceed to a DS/CDMA type interference canceller receiving apparatus according to a second embodiment of the present invention. The illustrated DS/CDMA type interference canceller receiving apparatus is similar in structure and operation to the conventional DS/CDMA type receiving apparatus illustrated in FIG. 2 except that the zeroth through the (N−1)-th path receivers are modified from that: illustrated in FIG. 2 as will later become clear and the DS/CDMA type interference canceller receiving apparatus further comprises a decision subtracter 22. The zeroth through the (N−1)-th path receivers are therefore depicted at 16A-0, 16A-1, . . . , and 16A-(N−1), respectively.

As shown in FIG. 7, the decision subtracter 22 is connected to input and output terminals of the decision unit 20. In other words, the decision subtracter 22 is supplied with the combined signal and the decided signal a from the combining unit 18 and the decision unit 20, respectively. The decision subtracter 22 subtracts the combined signal from the decided signal a to produce a decision error signal b. In other words, the decision subtracter 22 calculates a decision difference between the combined signal and the decided signal a to produce the decision error signal b indicative of the decision difference. At any rate, a combination of the decision unit 20 and the decision subtracter 22 serves as an decision error producing arrangement for producing the decision error signal b on the basis of the combined signal. The decision error signal b is supplied to the zeroth through the (N−1)-th path receivers 16A-0 to 16A-(N−1).

The zeroth through the (N−1)-th path receivers 16A-0 to 16A-(N−1) are similar in structure and operation to the zeroth through the (N−1)-th path receivers 16-0 to 16-(N−1) illustrated in FIG. 2 except that the zeroth through the (N−1)-th local subtracters 163-0 to 163-(N−1) are removed from the (N−1)-th path receivers 16-0 to 16-(N−1), respectively.

That is, the zeroth path receiver 16A-0 comprises the zeroth orthogonalization filter 161-0, the zeroth detector 162-0, the zeroth tap coefficient renewal unit 164-0, and the zeroth follow-up path detection unit 165-0. Similarly, the first path receiver 16A-1 comprises the first orthogonalization filter 161-1, the first detector 162-1, the first tap coefficient renewal unit 164-1, and the first follow-up path detection unit 165-1. The (N−1)-th path receiver 16A-(N−1) comprises the (N−1)-th orthogonalization filter 161-(N−1), the (N−1)-th detector 162-(N−1), the (N−1)-th tap coefficient renewal unit 164-(N−1), and the (N−1)-th follow-up path detection unit 165-(N−1). In general, an n-th path receiver 16A-n comprises the n-th orthogonalization filter 161-n, the n-th detector 162-n, the n-th tap coefficient renewal unit 164-n, and the n-th follow-up path detection unit 165-n.

In the n-th path receiver 16A-n, the n-th tap coefficient renewal unit 164-n is supplied from the decision subtracter 22 with the decision error signal b instead of the n-th local error signal. In the example being illustrated, the n-th tap coefficient renewal unit 164 renews, in response to the n-th delayed signal, the n-th detected signal, and the decision error signal b, the adaptive tap coefficients of the n-th coefficient control signal so as to minimize mean power of the decision error signal b. In addition, the n-th tap coefficient renewal unit 164-n resets, in response to the n-th reset signal from the follow-up path control unit 14, the adaptive tap coefficients of the n-th coefficient control signal.

Inasmuch as the decision subtracter 22 is used in place of the zeroth through the (N−1)-th local subtracters 163-0 to 163-(N−1), the DS/CDMA type interference canceller receiving apparatus illustrated in FIG. 7 is simple in structure in comparison with that illustrated in FIG. 2.

While this invention has thus far been described in conjunction with a few preferred embodiments thereof, it will now be readily possible for those skilled in the art to put this invention into various other manners. For example, the orthogonalization filter may be implemented by a decision feedback type equalizer in lieu of a linear equalizer such as a transversal filter.

What is claimed is:

1. A direct sequence/code division multiple access (DS/CDMA) type interference canceller receiving apparatus comprising:
   a delaying unit, supplied with a reception signal via different propagation paths, for delaying the reception signal for first through (N−1)-th delay amounts to produce zeroth through (N−1)-th delayed signals, where N represent a positive integer which is not less than two, the zeroth delayed signal being the reception signal as it is, the first through the (N−1) delayed signals being signals into which the reception signal are delayed for the first through the (N−1)-th delay amounts;
   zeroth through (N−1)-th path receivers, connected to said delaying unit and supplied with a peculiar spread code in common and with the zeroth through the (N−1)-th delayed signals, respectively, for demodulating the zeroth through the (N−1)-th delayed signals in response to zeroth through (N−1)-th coefficient control signals each indicative of adaptive tap coefficients to produce zeroth through (N−1)-th demodulated signals, respectively, said zeroth through said (N−1)-th path receivers including zeroth through (N−1)-th follow-up path detection units for detecting zeroth through (N−1)-th follow-up paths for said zeroth through said (N−1)-th path receivers on the basis of the peculiar spread code in response to the zeroth through the (N−1)-th coefficient control signals, respectively, said zeroth through said (N−1)-th follow-up path detection units producing zeroth through (N−1)-th follow-up path information indicative of the zeroth through the (N−1)-th follow-up paths, respectively;
   a combining unit, connected to said zeroth though said (N−1)-th path receivers, for combining the zeroth through the (N−1)-th demodulated signals into a combined signal;
   a multi-path searcher, supplied with the reception signal, for searching the different propagation paths in response to the reception signal to produce searched path information indicative of the different propagation paths; and
   a follow-up path control unit, connected to said multi-path searcher, the delaying unit, and said zeroth through said (N−1)-th path receivers, for controlling path reception timings for said zeroth through said (N−1)-th path receivers on the basis of the searched path information and the zeroth through the (N−1)-th follow-up path information, said follow-up path control unit supplying said delaying unit with a path reception timing signal indicative of the first through the (N−1)-th delay amounts.

2. A DS/CDMA type interference canceller receiving apparatus as claimed in claim 1, wherein an n-th follow-up path detection unit, where n represents a variable between 0 to (N−1), both inclusive, comprises:
   an n-th correlation detecting circuit, supplied with the peculiar spread code and the n-th coefficient control signal, for calculates cross-correlation between the adaptive tap coefficients indicated by the n-th coefficient control signal and the peculiar spread code to produce an n-th cross-correlated signal indicative of the cross-correlation; and
   an n-th maximum detecting circuit, connected to said n-th correlation detecting circuit, for detecting a maximum in the n-th cross-correlated signal to produce an n-th maximum detected signal indicative of the maximum as the n-th follow-up path information.

3. A DS/CDMA type interference canceller receiving apparatus as claimed in claim 1, wherein said DS/CDMA type interference canceller receiving apparatus further comprises a decision unit, connected to said combining unit, for deciding the combined signal to produce a decided signal, an n-th path receiver being connected to said decision unit where n represents a variable between 0 to (N−1), both inclusive, said n-th path receiver further comprising:
   an n-th orthogonalization filter, supplied with the n-th delayed signal from said delaying unit, for carrying out inverse spread on the n-th delayed signal using the n-th coefficient control signal to produce an n-th orthogonalized signal;
   an n-th detector, connected to said n-th orthogonalization filter, for carrying out carrier phase synchronization on the n-th orthogonalized signal to produce an n-th carrier phase signal as an n-th demodulated signal;
   an n-th local subtracter, connected to said n-th detector and said decision unit, for subtracting the n-th carrier phase signal from the decided signal to produce an n-th local error signal; and
   an n-th tap coefficient renewal unit, supplied with the n-th delayed signal and connected to said n-th detector, said n-th local subtracter, said n-th orthogonalization filter, and said n-th follow-up path detection unit, for renewing the adaptive tap coefficients for said n-th orthogonalization filter on the basis of the n-th delayed signal, the n-th carrier phase signal, and the n-th local error signal so as to minimize mean power of said n-th local error signal, said n-th tap coefficient renewal unit supplying said orthogonalization filter and said n-th follow-up path detection unit with the n-th coefficient control signal representative of the adaptive tap coefficients.

4. A DS/CDMA type interference canceller receiving apparatus as claimed in claim 3, wherein said orthogonalization filter is a transversal filter.

5. A DS/CDMA type interference canceller receiving apparatus as claimed in claim 3, the searched path information indicating zeroth through (N−1)-th multi-path searched detection paths having zeroth through (N−1)-th searcher reception quality while the zeroth through the (N−1)-th follow-up path information indicate zeroth through (N−1)-th follow-up paths having zeroth through (N−1)-th follow-up reception quality, respectively, wherein said follow-up path control unit comprising:

an rearrangement circuit, connected to said zeroth through said (N−1)-th follow-up path detection units, for rearranging the zeroth through the (N−1)-th follow-up paths having the zeroth through the (N−1)-th follow-up reception quality in the order of lowering in reception quality to produce zeroth through (N−1)-th rearranged follow-up paths having zeroth through (N−1)-th rearranged follow-up reception quality, respectively;

a matching circuit, connected to said rearrangement circuit and said multi-path searcher, for matching the zeroth through the (N−1)-th rearranged follow-up paths having the zeroth through the (N−1)-th rearranged follow-up reception quality with the zeroth through the (N−1)-th multi-path searched detection paths having the zeroth through the (N−1)-th searcher reception quality to produce matching result signals indicative of matching results; and a path receiver reset circuit, connected to said matching circuit, said delaying unit, and said zeroth through said (N−1)-th tap coefficient renewal units, for supplying, in response to the matching result signals, said delaying unit and said zeroth through said (N−1)-th tap coefficient renewal units with a path reception timing signal indicative of the first through the (N−1)-th delay amounts and zeroth through (N−1)-th reset signals, respectively, said path receiver reset circuit making said zeroth through said (N−1)-th path receivers preferentially receive the reception signal via the propagation paths having good reception quality on the basis of the matching result signals.

6. A DS/CDMA type interference canceller receiving apparatus as claimed in claim 1, wherein said DS/CDMA type interference canceller receiving apparatus further comprises a decision error producing means, connected to said combining unit, for producing a decision error signal on the basis of the combined signal, an n-th path receiver being connected to said decision error producing means where n represents a variable between 0 to (N−1), both inclusive, said n-th path receiver further comprising:

an n-th orthogonalization filter, supplied with the n-th delayed signal from said delaying unit, for carrying out inverse spread on the n-th delayed signal using the n-th coefficient control signal to produce an n-th orthogonalized signal;

an n-th detector, connected to said n-th orthogonalization filter, for carrying out carrier phase synchronization on the n-th orthogonalized signal to produce an n-th carrier phase signal as an n-th demodulated signal; and an n-th tap coefficient renewal unit, supplied with the n-th delayed signal and connected to said n-th detector, said decision error producing means, said n-th orthogonalization filter, and said n-th follow-up path detection unit, for renewing adaptive tap coefficients for said n-th orthogonalization filter on the basis of the n-th delayed signal, the n-th carrier phase signal, and the decision error signal so as to minimize mean power of said decision error signal, said n-th tap coefficient renewal unit supplying said orthogonalization filter and said n-th follow-up path detection unit with the n-th coefficient control signal representative of the adaptive tap coefficients.

7. A DS/CDMA type interference canceller receiving apparatus as claimed in claim 6, wherein said decision error producing means comprises:

a decision unit, connected to said combining unit, for deciding the combined signal to produce a decided signal; and a decision subtracter, connected to said decision unit and said combining unit, for subtracting the combined signal from the decided signal to produce the decision error signal.

8. A DS/CDMA type interference canceller receiving apparatus as claimed in claim 6, wherein said orthogonalization filter is a transversal filter.

9. A DS/CDMA type interference canceller receiving apparatus as claimed in claim 6, the searched path information indicating zeroth through (N−1)-th multi-path searched detection paths having zeroth through (N−1)-th searcher reception quality while the zeroth through the (N−1)-th follow-up path information indicate zeroth through (N−1)-th follow-up paths having zeroth through (N−1)-th follow-up reception quality, respectively, wherein said follow-up path control unit comprising:

an rearrangement circuit, connected to said zeroth through said (N−1)-th follow-up path detection units, for rearranging the zeroth through the (N−1)-th follow-up paths having the zeroth through the (N−1)-th follow-up reception quality in the order of lowering in reception quality to produce zeroth through (N−1)-th rearranged follow-up paths having zeroth through (N−1)-th rearranged follow-up reception quality, respectively;

a matching circuit, connected to said rearrangement circuit and said multi-path searcher, for matching the zeroth through the (N−1)-th rearranged follow-up paths having the zeroth through the (N−1)-th rearranged follow-up reception quality with the zeroth through the (N−1)-th multi-path searched detection paths having the zeroth through the (N−1)-th searcher reception quality to produce matching result signals indicative of matching results; and a path receiver reset circuit, connected to said matching circuit, said delaying unit, and said zeroth through said (N−1)-th tap coefficient renewal units, for supplying, in response to the matching result, signals, said delaying unit and said zeroth through said (N−1)-th tap coefficient renewal units with a path reception timing signal indicative of the first through the (N−1)-th delay amounts and zeroth through (N−1)-th reset signals, respectively, said path receiver reset circuit making said zeroth through said (N−1)-th path receivers preferentially receive the reception signal via the propagation paths having good reception quality on the basis of the matching result signals.

* * * * *